United States Patent Office 3,746,742
Patented July 17, 1973

3,746,742
POLYGLYCOL-ETHYLENE-IMINE DERIVATIVES
Erich Schuierer and Dieter Hoffmann, Burghausen, and Siegfried Rebsdat, Altotting, Germany, assignors to Farbwerke Hoechst Aktiengesellschaft vormals Meister Lucius & Bruning, Frankfurt am Main, Germany
No Drawing. Filed Aug. 26, 1970, Ser. No. 67,277
Claims priority, application Germany, Sept. 17, 1969, P 19 46 955.7
Int. Cl. C07c 125/06
U.S. Cl. 260—471 C      3 Claims

ABSTRACT OF THE DISCLOSURE

Polyadducts are obtained when treating methanes having ethylene-imine rings and a polyether chain or a fluoroalkyl chain with acidic compounds. The polyadducts are textile finishing agents rendering textiles hydrophobic and oleophobic and achieve the so-called soil-release effect.

PREAMBLE

The present invention relates to new polyadducts of the ethyleneimine type, especially to polyethyleneimines the nitrogen of which is part of a substituted urea containing N-toluene urethane groups with polyglycol ether chains or fluorinated alkanols as alcohol moieties.

A further object of this invention is the preparation of said polyadducts by treating the corresponding ethylene-imine ureas with Lewis acids or aqueous mineral acids.

Still a further object of the present invention is the use of the new polyadducts as textile finishing agents or a process for achieving the so-called "soil release" effect to textiles while rendering them oleophobic and hydrophobic.

Still further objects will appear to anyone skilled in the art from the following disclosure.

The present invention relates to polyadducts consisting of recurrent units of the formula

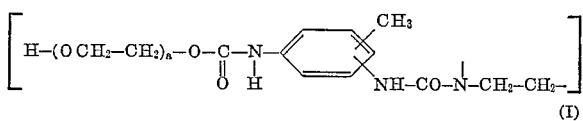
(I)

wherein $a$ stands for a number of from 4 to about 70 and of recurrent units of the formula

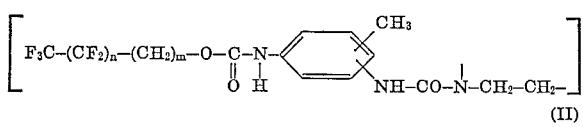
(II)

in which $n$ represents an integer of from 3 to 11, preferably 5 to 9, and $m$ represents 1 or 2, per unit free from fluorine existing 0.5 to 5 fluorinated units, and a process for preparing these polyadducts, which comprises reacting 1 mol of an ethylene imine of the formula

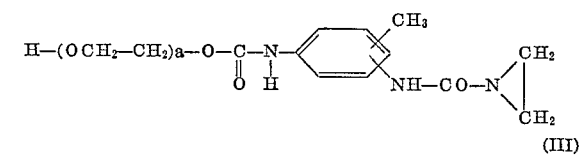
(III)

wherein $a$ has the above meaning, with 0.5 to 5 mols of an ethylene imine of the formula

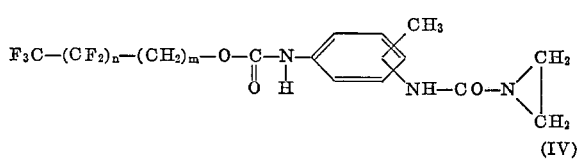
(IV)

in which $n$ and $m$ are defined as above, dissolved in an inert organic solvent having a low boiling point and in the presence of boron trifluoride or aqueous solutions of mineral acids.

Said reaction is carried out at temperatures of from about 55 to about 100° C., preferably at about 70 to about 90 °C.

The molar ratio of the ethylene imines free from fluorine to the fluorinated ethylene imines is between about 2:1 and about 1:5, the weight ratio preferably within the limits of about 2:1 to about 1:3, particularly to about 1:2.

The ethylene imines are used as solutions in inert organic solvents having a low boiling point. When operating in an aqueous system, the solvent is chosen in such a way that it evaporates under the reaction conditions, expediently in such a rate as the solution is added dropwise. As solvents inert towards the ethylene imine derivatives, there may be considered especially fluorinated chloro-hydrocarbons of a low molecular weight and low-molecular-weight ketones such as methyl ethyl ketone, methyl isopropyl ketone and particularly acetone.

As polycondensation catalyst there is used boron trifluoride, preferably as dioxane adduct, or an aqueous mineral acid solution, preferably diluted sulfuric acid, nitric acid or perchloric acid, especially hydrochloric acid. Hereinafter some preferred operation methods of the preparation process according to invention are described, using preferably hydrochloric acid.

The hydrochloric acid concentration in the reaction mixture advantageously reaches from about 0.5 to about 5% by weight. In principle, lower or higher concentrations are possible but not advantageous and furthermore require special measures.

It has turned out to be suitable to add to the reaction mixture a polyglycol of the formula

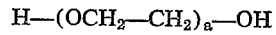

wherein $a$ is a number of from 4 to about 70. Preferred are polyglycols having about 10 to about 50, particularly about 20 to about 50 ethylene glycol units as for example polyglycols with average molecular weights of from about 600 to about 2000.

The starting materials for the process according to invention are obtained as follows:

The ethylene imine derivative free from fluorine are obtained by reacting ethylene imine with toluene-diisocyanates, preferably in acetone solution at 0–20° C. in an atmosphere of inert gas and by reating the urea derivative so obtained with a polyethylene-glycol having a molecular weight range of from about 200 to about 3000, preferably of from about 1000 to about 2000. The reaction of the urea derivative with the polyglycol is expediently carried out at about 20 to about 40° C.

The fluorinated ethylene imines are obtainable by reacting the adducts from fluoroalkanols and toluene-diisocyanates known from French patent specification No. 1,438,617 with ethylene-imines. This reaction is advantageously carried out at about 0 to about 20° C.

A preferred operation method consists in mixing one part by weight of the compound of diisocyanate, ethylene-imine and polyglycol obtained in acetonic solution in situ with an acetonic solution containing 0.5 to 3 parts by weight of the fluorinated ethylene-imine and in adding this mixture dropwise at about 70 to about 90° C. into a solution of hydrochloric acid in water. It is advantageous to add to this bath of hydrochloric acid about 1 to about 10% by weight, preferably about 3 to about 6% by weight of a polyethylene-glycol having a molecular weight of from about 200 to about 3000, preferably about 1000 to about 2000. There is expediently used the same polyglycol as that bound to the ethylene imine derivative.

By this process the ethylene-imine ring is opened under the catalytic action of the hydrochloric acid, and a polyaddition of the following components is initiated:

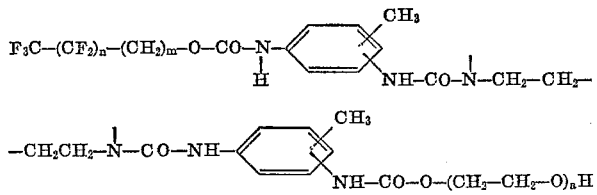

The employed solvent evaporates within the mentioned temperature range and may be reintegrated into the process after recovery.

The polyadducts are obtained as colorless, aqueous stable dispersions, the active ingredient content of which preferably fluctuates between 10 and 30%. The solids content remaining constant, viscosity of the dispersion increases in dependency on the hydrogen chloride concentration. When the concentration in the bath amounts to 0.5 to 1% of hydrochloric acid, low-viscous emulsions are obtained, whereas 3 to 5% of hydrochloric acid result in viscous, gel-like pastes which are thixotropic.

The resulting concentrated dispersions may easily be diluted to for example 1% of active ingredient by introducing while stirring into water or by addition of water.

It is also possible to start the reaction in anhydrous inert organic solvents with boron fluoride. The products are generally obtained in form of solids. The solution of these solids in low-molecular-weight ketones, for example methylethyl ketone and particularly acetone or mixtures of low-molecular-weight fluorinated chloro-hydrocarbons and low molecular-weight alcohols, especially mixtures of 1,1,2-trifluoro-1,2,2-trichloro-ethane and isopropanol are highly suitable for textile finishing. These mixtures have the advantage that they may easily be sprayed.

The molar ratio of the ethylene-imine derivatives free from fluorine to those containing fluorine is expediently calculated in such a way that the fluorine content of the active ingredient ranges between 10 and 30%.

The preparation process according to invention and the excellent properties of the products so obtained are illustrated by the following examples and test results.

EXAMPLE 1

14 g. (0.08 mol) of toluene-diisocyanate (essentially 2,4-isomer) were dissolved in 100 ml. of acetone and mixed in an atmosphere of nitrogen with 3.5 g. (0.08 mol) of ethylene-imine at 10 to 20° C. 80 g. (0.08 mol) of polyethylene-glycol having a molecular weight of 1000 were introduced while stirring into this solution at 30 to 40° C. A solution of the product having the formula

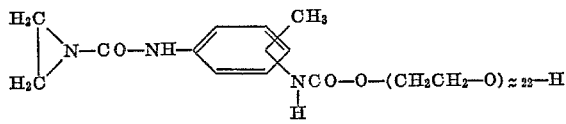

was obtained which was mixed with a solution of 100 g. (0.15 mol) of the fluorinated ethylene-imine having the formula

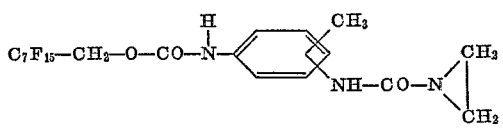

(obtained from equimolar amounts of toluene-diisocyanate (essentially 2,4-isomer), 1,1-dihydroperfluoro-octanol-(1) and ethylene-imine) in 100 ml. of acetone.

For polyaddition, this mixture was added while stirring vigorously at 70–90° C. within 4 hours into an aqueous bath containing 600 ml. of $H_2O$, 8 ml. of 35% hydrochloric acid and 18 g. of polyethylene-glycol having a molecular weight of about 1000. At the mentioned polymerization temperature, 195 ml. of acetone distilled continuously off in the rate of solution added dropwise. When the reaction was completed, a low-viscous dispersion was obtained having a solids content of 26%, the fluorine content of the active ingredient being 22% and the pH-value about 1.

EXAMPLE 2

The reaction was carried out as described in Example 1, using the following amounts: 21 g. (0.13 mol) of toluene-diisocyanate, 5.5 g. of ethylene-imine (0.13 mol), 130 g. (0.13 mol) of polyethylene-glycol having a molecular weight of about 1000 and 75 g. (0.11 mol) of the fluorinated ethylene-imine. These substances were added as described above to an aqueous bath (690 ml. of $H_2O$, 15 ml. of 35% hydrochloric acid and 21 g. of polyethylene-glycol of a molar weight of about 1000). A dispersion was obtained with an active ingredient content of 26.4% the fluorine content of which was 13.7%.

EXAMPLE 3

The reaction was carried out as described in Example 1, using the following amounts: 14 g. (0.08 mol) of toluene-diisocyanate, 3.5 g. (0.08 mol) of ethylene-imine, 80 g. (0.08 mol) of polyethylene-glycol having a molar weight of about 1000 and 200 g. (0.3 mol) of the fluorinated ethylene-imine. These substances were added as described above to an aqueous bath (900 ml. of $H_2O$, 30 ml. of 35% hydrochloric acid and 27 g. of polyethylene-glycol having a molecular weight of about 1000). A dispersion having an active ingredient content of 26% was obtained, the fluorine content of which was 28.5%.

EXAMPLE 4

The reaction was carried out as described in Example 1, using the following amounts: 11.4 g. (0.066 mol) of toluene-diisocyanate, 2.85 g. (0.066 mol) of ethylene-imine, 136 g. (0.066 mol) of polyethylene-glycol having an average molecular weight of 2060 and 150 g. (0.22 mol) of the fluorinated ethylene-imine. These substances were introduced as described above into an aqueous bath (900 ml. of water, 30 ml. of 35% hydrochloric acid and 54 g. of polyethylene-glycol of a molecular weight of 2060). A dispersion having an active ingredient content of 27.5% was obtained, the fluorine content of which being 19.5%.

EXAMPLE 5

13.6 g. (0.078 mol) of commercial toluene-diisocyanate (essentially 2,4-isomer) were dissolved in 100 ml. of acetone and mixed in an atmosphere of nitrogen with 3.4 g. (0.078 mol) of ethylene-imine at 10–20° C. 47 g. (0.078 mol) of polyethylene-glycol having a molecular weight of 600 were introduced while stirring into this solution at 30 to 40° C.

A solution of the product having the formula

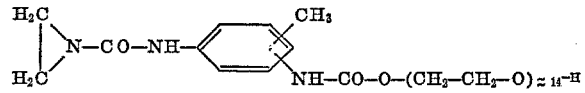

was obtained, which was added to a solution of 65.2 g. (0.158 mol) of a fluorinated ehtylene-imine mixture of the formula

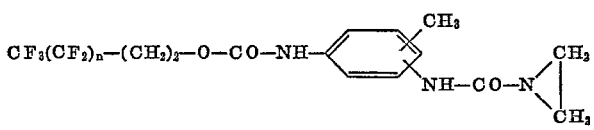

$n=7.5$ (as an average value from $n=5$, 7 and 9 in the ratio mentioned below) obtained from equimolar amounts of toluene-diisocyanate (essentially 2,4-isomer), a mixture of fluorinated alcohols consisting of 21.8% of n—$C_6F_{13}(CH_2)_2OH$
56.8% of n—$C_8F_{17}(CH_2)_2OH$ (average molecular weight 413.5.)
and
21.4% of n—$C_{10}F_{21}(CH_2)_2OH$ and ethylene-imine in 100 ml. of acetone.

For polyaddition this mixture was added while stirring vigorously at 70 to 80° C. within 3 hours into an aqueous bath which consisted of 400 ml. of $M_2O$
6 ml. of HCl (35%) and
15 g. of polyethylene-glycol having a molecular weight of about 1000.

At the mentioned polymerization temperature 195 ml. of acetone distilled continuously off in the rate as the solution was added dropwise. When the reaction was completed, a low viscous dispersion was obtained having a solids content of about 26%, the fluorine content of which was 15.4%.

Test methods and results

Textiles (polyethylene-glycol-terephthalate and cotton) finished with the aqueous dispersions according to this invention obtained as described in the following examples, were pre-treated for test purposes for:

oil- and water repellency
fastness to solvents, and
soil release capacity according to the following method:

The fabric samples were submerged into aqueous dispersions of active ingredients and then squeezed off. The material to be tested and judged after a reaction time of 3 minutes using the following characteristics:

+ No wetting
± slight wetting
— immediate wetting

For testing the fastness to washing of the soil release finishing, the samples were washed with a commercially available detergent up to 5 times at 100° C.

For testing the soil release capacity, two types of soiling deposits were used:

(a) soiled motor oil
(b) oilve oil and 1% by weight of the dyestuff Colour Index No. 26100.

The separately applied soiling deposits for test purposes were contacted for 15 minutes at 25° C. with the textile samples finished with the chemicals according to invention (size of the samples 7 x 7 cm.; amount of the soiling deposits 0.1 ml.). After being covered with glass the soiled fabric samples were exposed for 30 minutes to a pressure of 1 kg./49 cm.$^2$ and subsequently aged for one hour at 80° C. in a drier. Then the fabric samples were washed at 100° C. with a commercially available detergent, and the washing resistance of the soil was determined.

For testing the fastness to washing of the soil release finishing, the samples were washed 5 times and then soiled.

On the basis of these test methods the products according to this invention were examined on polyethylene-glycol-terephthalate and cotton and compared with a commercial product. The results are listed in Table 1. They were determined by coating with 1% of active substance, calculated on the fabric weight.

TABLE 1

|  | Polyethylene glycol-terephthalate, Example 1 | Cotton Example | | | | | Commercial + product |
|---|---|---|---|---|---|---|---|
|  |  | 1 | 2 | 3 | 4 | 5 |  |
| Oil-and-water repellency: |  |  |  |  |  |  |  |
| Not washed | 110+ | 120+ | 100+ | 100+ | 110+ | 100+ | 90+. |
| Washed 1X | 110+ | 100+ | 100+ | 100+ | 100+ | 70— | 70—. |
| Washed 2X | 110+ | 100+ | 90+ | 90+ | 90+ | 70— | 70—. |
| Washed 5X | 110+ | 90+ | 90+ | 80+ | 90+ | 0 | 0—. |
| Soil release capacity | Good | Very good | Good | Very good | Very good | Good | Good. |
| Resistance to washing | Very good | do | do | Good | Good | do | Moderate. |

[1] Commercial product FC 218 of 3-M Company.

NOTE.—Explanation of the smybols + and — cf, see above.

highly concentrated dispersions of the new fluorinated products were diluted with water to an active ingredient content of 1%. The submerged and dried fabric samples were exposed during 5 minutes at 150° C. to a thermal after-treatment. The active ingredient pick-up was 0.9 to 1%, calculated on the fabric weight.

The oil-repellency of the fabrics finished in this way was tested with n-heptane-paraffin oil mixtures according to the scale of value given in U.S. patent specification No. 3,362,782:

| Oil repellency value | Percent by volume of n-heptane | Percent by volume of paraffin oil DAB 6 [1] |
|---|---|---|
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |
| 130 | 80 | 20 |

[1] DAB=Deutsches Arzneibuch.

In order to test water repellency (water-repellent effect) water drops were applied with a pipet on the ma-

EXAMPLE 6

50 g. (0.075 mol) of an addition product consisting of equimolar amounts of toluene-diisocyanate (essentially 2,4 - isomer), n-1,1,2,2-tetrahydro-perfluorodecanol-(1) and ethylene-imine and 50 g. (0.042 mol) of an addition product of equimolar amounts of the above diisocyanate, polyethylene-glycol having a molar weight of 1000 and ethylene-imine, were heated in 100 g. of acetone, resulting in a nearly complete solution of the compounds. This solution was mixed with 0.5 g. of $BF_3$-dioxane and maintained for 5 hours at 50° C. After the acetone had been eliminated, a slightly yellow and sticky powder was obtained which was easily soluble in acetone and mixtures of 1,1,2-trifluoro-1,2,2-trichloro-ethane with isopropanol.

A blended fabric of polyethylene-glycol-terephthalate and cotton (50:50) was sprayed with solution of the before mentioned polyadduct in 1,1,2-trifluoro-1,2,2-trichloroethane/isopropanol (1:1), so that the pick-up of fluorine was 0.2%, calculated on the fabric weight. Then the fabric was fixed for 5 minutes at 150° C. The so finished fabric showed an initial oil repellency value of from 110 to 120.

With a fluorine coating of 0.1% obtained in analogous way, an initial oil repellency value of 80 had already been obtained.

We claim:
1. A polyadduct consisting essentially of recurring units of the Formula I

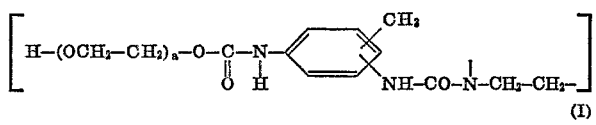

in which $a$ is a number of about 4 to about 70, and of recurring units of the Formula II

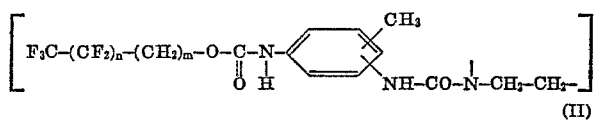

in which $n$ is a number of 3 to 11 and $m$ is 1 or 2, the ratio of the units of Formula I to units of Formula II being about 1:0.5 to about 1:5.

2. The polyadduct as claimed in claim 1, wherein $n$ stands for a number of 5 to 9.

3. The polyadduct as claimed in claim 1, wherein $a$ stands for a number of about 10 to about 50.

References Cited
UNITED STATES PATENTS 3,491,141   1/1970   Grakauskas _____ 260—471 C LORRAINE A. WEINBERGER, Primary Examiner L. A. THAXTON, Assistant Primary U.S. Cl. X.R.

117—121; 260—239 E